(12) United States Patent
Indefrey et al.

(10) Patent No.: US 8,242,901 B2
(45) Date of Patent: Aug. 14, 2012

(54) ASI NETWORK FOR EXPLOSION-HAZARD AREAS

(75) Inventors: Klaus Indefrey, Nürnberg (DE); Maximilian Korff, Kalchreuth (DE); Andreas Schiff, Eriskirch (DE); Bernhard Wiesgickl, Vilseck (DE)

(73) Assignee: Siemens Aktiengesellschaft, Munich (DE)

( * ) Notice: Subject to any disclaimer, the term of this patent is extended or adjusted under 35 U.S.C. 154(b) by 802 days.

(21) Appl. No.: 12/071,551

(22) Filed: Feb. 22, 2008

(65) Prior Publication Data

US 2008/0224850 A1 Sep. 18, 2008

(30) Foreign Application Priority Data

Feb. 27, 2007 (EP) .................................... 07004075

(51) Int. Cl.
*G08B 1/00* (2006.01)
(52) U.S. Cl. ............ 340/538; 340/531; 340/532; 361/1; 361/119
(58) Field of Classification Search .................. 340/532, 340/538, 500, 693.1, 310.11, 333, 425.2; 710/100–317
See application file for complete search history.

(56) References Cited

U.S. PATENT DOCUMENTS

| | | | |
|---|---|---|---|
| 5,450,305 A * | 9/1995 | Boys et al. ....................... 363/24 |
| 6,154,679 A * | 11/2000 | Kessler et al. ...................... 700/9 |
| 6,304,934 B1 * | 10/2001 | Pimenta et al. ................ 710/305 |
| 6,397,322 B1 * | 5/2002 | Voss ................................. 712/35 |
| 6,525,915 B1 * | 2/2003 | Graube ............................ 361/58 |
| 6,563,718 B1 | 5/2003 | Li et al. |
| 6,614,634 B1 * | 9/2003 | Westerfeld et al. .............. 361/62 |
| 6,686,831 B2 * | 2/2004 | Cook et al. ..................... 323/273 |
| 6,819,576 B2 * | 11/2004 | Johnson, Jr. ................... 363/123 |
| 6,885,949 B2 * | 4/2005 | Selli ................................. 702/57 |
| 7,805,265 B2 | 9/2010 | Namba et al. |
| 7,898,786 B2 * | 3/2011 | Schmidt ......................... 361/119 |
| 2002/0163427 A1 * | 11/2002 | Eryurek et al. ................ 340/500 |

(Continued)

FOREIGN PATENT DOCUMENTS

EP 355 532 A2 2/1990

(Continued)

OTHER PUBLICATIONS

Japanese Notice of Reasons for Rejection, dated Aug. 24, 2010, issued in corresponding application No. JP 2008-034599 and English translation thereof.

(Continued)

*Primary Examiner* — Daniel Wu
*Assistant Examiner* — Ryan Sherwin
(74) *Attorney, Agent, or Firm* — Harness, Dickey & Pierce, P.L.C.

(57) ABSTRACT

At least one embodiment of the invention relates to a fieldbus system, in particular for use in an explosion-hazard area. The fieldbus system, in at least one embodiment, has a plurality of bus line sections with bus lines; an isolating element, by which in each case two of the plurality of bus line sections are coupled to one another and which galvanically isolates the bus lines of the two bus line sections from one another such that this prevents any direct current flowing between the bus lines of the two bus line sections and communication signals are transmitted between the two bus line sections; and a supply source for each of the bus line sections, in order to provide an electrical power supply for field devices which can be connected to the respective bus line section.

15 Claims, 2 Drawing Sheets

U.S. PATENT DOCUMENTS

2004/0008467 A1 * 1/2004 Calandre et al. .............. 361/119

FOREIGN PATENT DOCUMENTS

| JP | 63-155860 | 6/1988 |
| --- | --- | --- |
| JP | 2-223384 | 9/1990 |
| JP | 5260568 | 10/1993 |
| JP | 7-193885 | 7/1995 |
| JP | 9-303306 | 11/1997 |
| JP | 10-261995 | 9/1998 |
| JP | 2000-224252 | 8/2000 |
| JP | 2002-008182 | 1/2002 |
| JP | 2005-512486 | 4/2005 |
| JP | 2006-236301 | 9/2006 |
| WO | WO 9945621 A1 | 9/1999 |
| WO | WO 2005057783 A1 * | 6/2005 |
| WO | WO 2005/111635 | 11/2005 |

OTHER PUBLICATIONS

German translation of Japanese Office Action for corresponding Japanese Patent Application No. 2008-34599.

* cited by examiner

ASI NETWORK FOR EXPLOSION-HAZARD AREAS

PRIORITY STATEMENT

The present application hereby claims priority under 35 U.S.C. §119 on European patent application number EP07004075 filed Feb. 27, 2007, the entire contents of which is hereby incorporated herein by reference.

FIELD

Embodiments of the invention generally relate to an ASI network for explosion-hazard areas.

BACKGROUND

The expression ASI network (ASI: Actuator Sensor Interface) refers to a network with a bus system for communication between a controller (master) and field devices (slaves). An ASI bus system is a bit-oriented fieldbus for automation, and is optimized for connection of simple sensors, actuators and field devices which interchange only a small number of information bits with the controller and can not only carry out data communication but can also be supplied with electrical power via a generally 2-core line.

In order to allow electrical field devices to be operated in an explosion-hazard area, devices are required which have a specific type of ignition protection in order that they do not initiate any risk of ignition. Field devices which are intrinsically safe are particularly advantageous, since no additional measures are required to protect the fieldbus, for example encapsulation and shielding measures, in order to ensure explosion-proof operation.

With a fieldbus system such as this, it is generally possible to connect a large number of field devices in parallel to the bus lines. However, despite the field devices for the fieldbus being designed to be intrinsically safe in the explosion-hazard area, it is necessary for the power supplied via the bus lines to be limited in order to ensure that a spark which could initiate ignition cannot occur anywhere or at any time even in the bus line fault conditions stipulated in the standards. However, the energy provided by the controller cannot be reduced indefinitely, because of the transmission paths (line lengths) required in the fieldbus system and the minimum power required by the individual fieldbus devices.

Known fieldbus systems which are used in an explosion-hazard area and make use of the "intrinsically safe" type of ignition protection therefore restrict the length of the bus lines of the fieldbus to a specific distance (for example to 1 km), and restrict the number of fieldbus devices that can be connected to about 10, because it is not possible to supply a greater number of field devices, because of the limited power fed in.

SUMMARY

In at least one embodiment of the present invention, a fieldbus system is provided by which any desired number of fieldbus devices can be operated in a simple manner, and in which the length of the transmission path is not limited by the power transmission.

According to at least one embodiment of the invention, a fieldbus system is provided, in particular for use in an explosion-hazard area, which has a plurality of bus line sections with bus lines as well as an isolating element by which in each case two of the plurality of bus line sections are coupled to one another and which galvanically isolates the bus lines of the two bus line sections from one another such that this prevents any direct current flowing between the bus lines of the two bus line sections and communication signals are transmitted between the two bus line sections. The fieldbus system also has a supply source for each of the bus line sections, in order to provide an electrical power supply for field devices which can be connected to the respective bus line section.

A fieldbus system such as this has the advantage that the maximum permissible supply power on the bus lines does not restrict the number of field devices which can be operated on the fieldbus system. For this purpose, the fieldbus system has a plurality of bus line sections which are supplied separately from one another and on which the maximum permissible supply power on each of the bus lines is not exceeded. The total supply power can therefore be increased by using a plurality of bus line sections, so that the number of field devices being operated is not restricted by the supply.

The bus line is preferably provided with a terminating impedance on the bus line sections which have an open end. These bus line sections are generally those sections which are located at the start and at the end of the bus line.

Furthermore, at least one of the bus line sections whose bus lines have an open end may be provided with a terminating impedance.

The isolating element may be connected to in each case two bus lines of the two bus line sections, with the isolating element having a transformer with transformer coils, and with each of the transformer coils being connected in series with a respective isolating capacitance between the two bus lines of the corresponding bus line section.

A suppressor diode is preferably connected directly in parallel with at least one of the transformer coils of the transformer.

The supply sources for the bus line sections may be designed to be current and voltage limited.

The supply sources are preferably each coupled via a decoupling inductance to each of the bus lines of the corresponding bus line section.

The bus line sections are preferably at least partially arranged in an explosion-hazard area, with the supply sources for the bus line sections being arranged outside the explosion-hazard area.

Furthermore, at least one of the bus line sections can be connected via a connection section to a controller for providing communication with field devices which are connected to the bus line sections.

A plurality of bus line sections are preferably coupled via a respective isolating element to the connection section.

A plurality of the bus line sections can be connected with the aid of the isolating elements to form a series circuit.

BRIEF DESCRIPTION OF THE DRAWINGS

Example embodiments of the invention will be explained in more detail in the following text with reference to the attached drawings, without restricting the scope of protection prescribed by the patent claims, in which:

DETAILED DESCRIPTION OF THE EXAMPLE EMBODIMENTS

Figure 1:
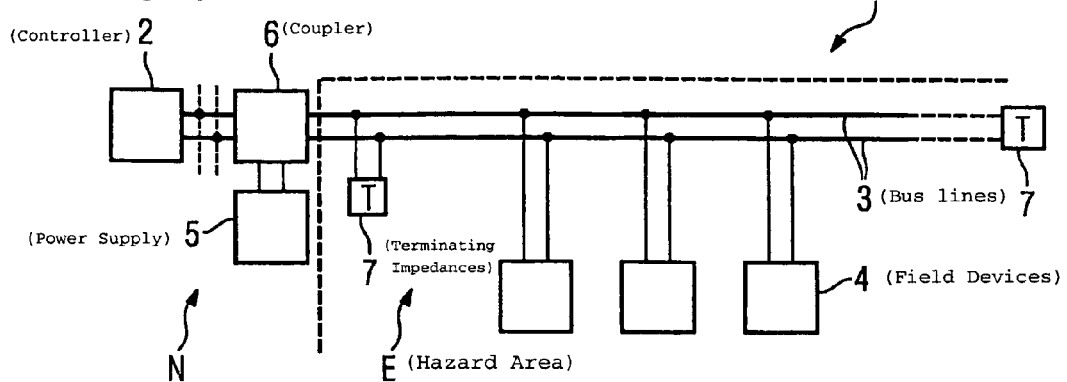
FIG. 1 shows a fieldbus system for use in an explosion-hazard area, with the fieldbus devices being designed to be intrinsically safe.

Various example embodiments will now be described more fully with reference to the accompanying drawings in which only some example embodiments are shown. Specific structural and functional details disclosed herein are merely representative for purposes of describing example embodiments. The present invention, however, may be embodied in many alternate forms and should not be construed as limited to only the example embodiments set forth herein.

Accordingly, while example embodiments of the invention are capable of various modifications and alternative forms, embodiments thereof are shown by way of example in the drawings and will herein be described in detail. It should be understood, however, that there is no intent to limit example embodiments of the present invention to the particular forms disclosed. On the contrary, example embodiments are to cover all modifications, equivalents, and alternatives falling within the scope of the invention. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments of the present invention. As used herein, the term "and/or," includes any and all combinations of one or more of the associated listed items.

It will be understood that when an element is referred to as being "connected," or "coupled," to another element, it can be directly connected or coupled to the other element or intervening elements may be present. In contrast, when an element is referred to as being "directly connected," or "directly coupled," to another element, there are no intervening elements present. Other words used to describe the relationship between elements should be interpreted in a like fashion (e.g., "between," versus "directly between," "adjacent," versus "directly adjacent," etc.).

The terminology used herein is for the purpose of describing particular embodiments only and is not intended to be limiting of example embodiments of the invention. As used herein, the singular forms "a," "an," and "the," are intended to include the plural forms as well, unless the context clearly indicates otherwise. As used herein, the terms "and/or" and "at least one of" include any and all combinations of one or more of the associated listed items. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Spatially relative terms, such as "beneath", "below", "lower", "above", "upper", and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, term such as "below" can encompass both an orientation of above and below. The device may be otherwise oriented (rotated 90 degrees or at other orientations) and the spatially relative descriptors used herein are interpreted accordingly.

Although the terms first, second, etc. may be used herein to describe various elements, components, regions, layers and/or sections, it should be understood that these elements, components, regions, layers and/or sections should not be limited by these terms. These terms are used only to distinguish one element, component, region, layer, or section from another region, layer, or section. Thus, a first element, component, region, layer, or section discussed below could be termed a second element, component, region, layer, or section without departing from the teachings of the present invention.

FIG. 1 shows a conventional fieldbus system for use in an explosion-hazard area. The fieldbus system has a conventional controller 2 for a conventional fieldbus system. The controller 2 is preferably arranged in an area N where there is no explosion-hazard. In the fieldbus system illustrated in FIG. 1, communication signals and the power supply are passed jointly via two bus lines 3 to field devices 4 which are located in an explosion-hazard area E. Since the controller 2 normally provides only data communication with the field devices 4, a supply source 5 is also provided in the area N where there is no explosion-hazard and provides an electrical power supply in order to apply electrical power to the bus lines 3 with the aid of a suitable coupler 6. The electrical power is passed via the bus lines 3 into the explosion-hazard area E such that the field devices 4 can tap off the electrical power from the bus lines 3. Terminating impedances 7 are also provided at the ends of the bus lines 3, in order to avoid signal reflections on the bus lines 3.

Only a limited amount of power may be transmitted via the bus lines 3 in the explosion-hazard area E, in order to avoid the occurrence of an ignition spark in the event of a malfunction. The electrical power supply 5 may therefore inject only a very limited amount of power into the bus lines, this considerably restricting the number of field devices 4 which can be operated on the bus lines 3 in the explosion-hazard area E, and also considerably limiting the line length between the electrical power supply 5 and the individual field devices.

Figure 2:
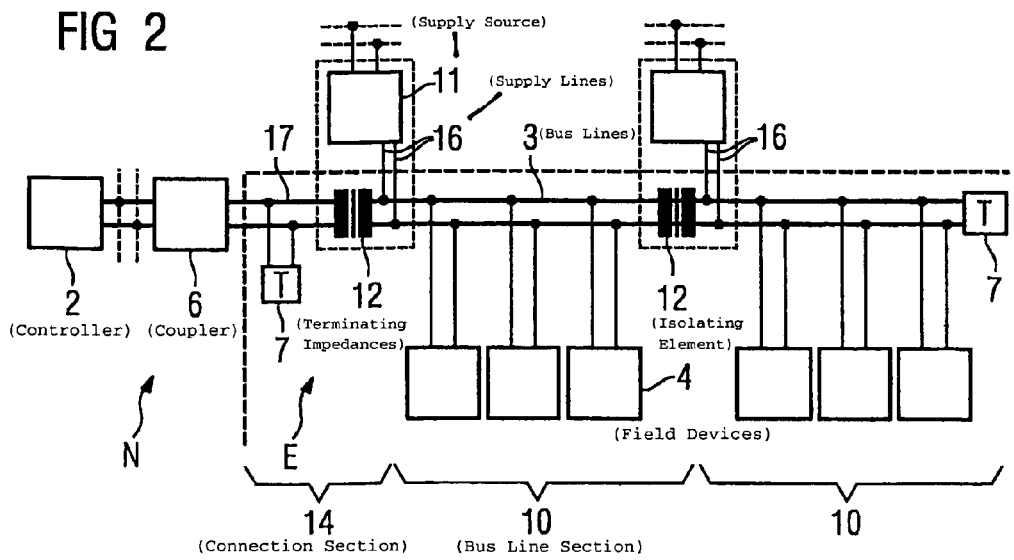
FIG. 2 shows a fieldbus system according to a first embodiment of the invention.

FIG. 2 shows a fieldbus system according to a first embodiment of the invention. The same reference symbols correspond to elements having the same or a comparable function in this embodiment and in the other embodiments that are described.

As in the case of the conventional fieldbus system that is illustrated in FIG. 1, the controller 2 for the fieldbus system shown in FIG. 2 is arranged outside the explosion-hazard area, in the area N in which there is no explosion-hazard, and is connected via the coupler 6 to that part of the fieldbus system which is located in the explosion-hazard area. The fieldbus system has bus line sections 10 which are arranged within the explosion-hazard area E, but which can also be provided outside the explosion-hazard area E. A number of field devices 4 can in each case be connected to the bus lines 3 of the respective bus line section 10 in the bus line sections 10.

The bus lines 3 of each of the bus line sections 10 are connected to their own supply source 11, which provides an independent electrical power supply for the respective bus line section 10 and for the field devices 4 connected to it. The supply source 11 is preferably intended to provide an electrical power supply for a plurality of field devices 4, but can also be intended to supply just one field device 4. The bus line sections 10 are galvanically isolated from one another by an isolating element 12, that is to say the bus lines 3 of different bus line sections 10 have no electrical connection to one another via which a direct current can flow. However, the isolating element 12 is designed in order to transmit the electrical communication signals between the bus lines 3 from bus line sections 10 which are isolated via the isolating element 12.

A connection section 14 is also provided between the first bus line section 10 and the coupler 6. The connection section 14 corresponds essentially to a bus line section to which no supply source and no field device is connected and which is used only for signal transmission between the explosion-hazard area and the area in which there is no explosion-hazard. The connection section 14 and the first bus line section 10 are likewise galvanically isolated in the manner described above by means of a corresponding isolating element 12.

The supply sources 11 therefore provide a dedicated separate electrical power supply for each of the bus line sections 10 and for the field devices 4 connected to them, such that the total amount of power being supplied and which is provided overall to the field devices 4 of the fieldbus is a multiple of the amount of supply power which could otherwise be made available by just one supply source 11 for operation of field devices 4 in the explosion-hazard area E.

The number of field devices 4 which can be arranged on one of the bus line sections 10, and the line length of the corresponding bus line section 10, are matched to the maximum permissible supply power from the supply source 11. The maximum permissible supply power is governed by the requirements for explosion-hazard areas. Since the bus line sections 10 are galvanically isolated from one another, the amount of power supplied in each of the bus line sections 10 can be limited to the power which is provided by the supply source 11. However, the overall length of the fieldbus with a plurality of bus line sections and the number of field devices 4 which can be connected are not restricted by the requirements for the supply power for one of the supply sources 11 since, essentially, any desired number of bus line sections 10 which are galvanically isolated from one another can be connected to one another by way of the supply sources 11 to form the fieldbus system 1.

In the example embodiment illustrated in FIG. 2, the bus line sections 10 are connected as a chain, that is to say they are connected one behind the other in series, and are each connected by means of an isolating element 12, with the last bus line section 10 being provided with a terminating impedance 7, in order to avoid disturbing reflections of the communication signals.

In the same way, the connection section 14 which connects the coupler 6 in the area N in which there is no explosion-hazard to a first isolating element 12, is likewise provided with a terminating impedance 7 in order to avoid signal reflections at the coupler 6.

Figure 3:
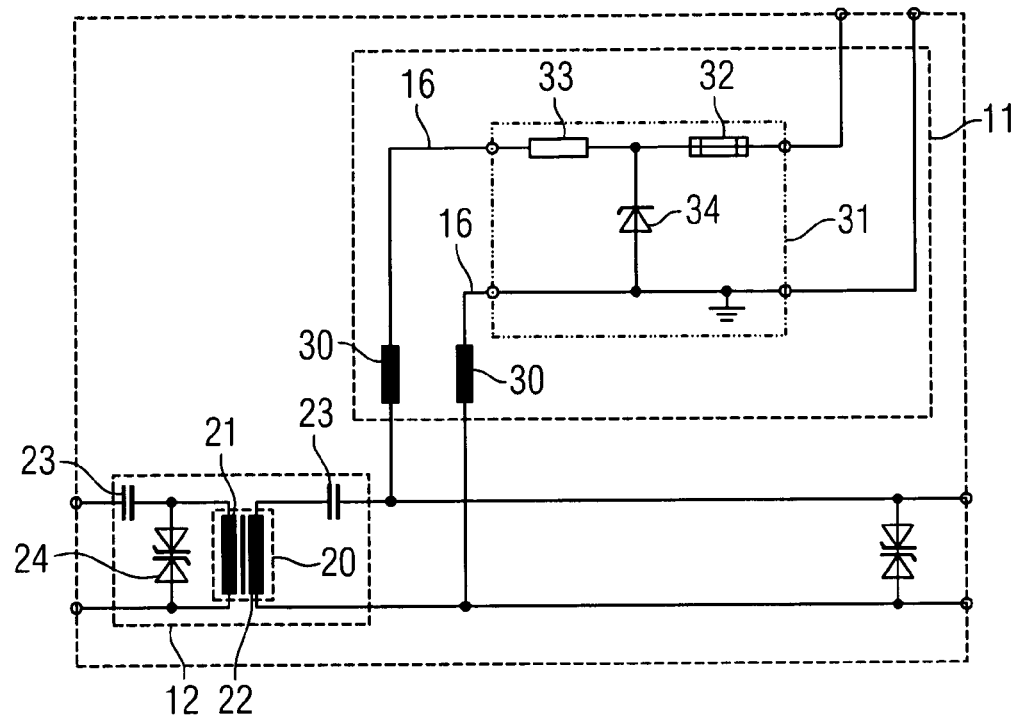
FIG. 3 shows a detailed illustration of the electrical power supply for a bus line section, as well as one implementation of galvanic decoupling between the bus line sections.

FIG. 3 shows a detailed illustration of the electrical power supply 11 and of the isolating element 12. The abovementioned isolating element 12 has a transformer 20 in order to transmit communication signals between the bus lines 3 of two bus line sections 10 which are connected to one another via the isolating element 12. In order to ensure that no short-circuit current (direct current) can flow via transformer coils 21 and 22 of the transformer 20 between the two bus lines of a bus line section 10, an isolating capacitance 23 is connected in series with each of the transformer coils 21, 22 and forms a high-pass filter, and at the same time galvanically isolates the two bus lines 3 of a bus line section 10 from one another, that is to say it prevents any direct current from flowing.

Furthermore, each of the isolating elements 12 is provided with at least one suppressor diode 24, which is connected between the two bus lines 3 of a bus line section 10. The suppressor diode 24 is preferably connected by one connection between the isolating capacitance 23 and a connection of the series-connected transformer coil 21, 22, and by a further connection to a further connection of the corresponding transformer coil 21, 22. In the overall arrangement, the isolating elements 12 are arranged between the bus line sections 10 such that at least one suppressor diode 24 is arranged between the bus lines 3 of each bus line section 10. The suppressor diode 24 is necessary because of a requirement for safety in explosion-hazard areas, and is used to limit overvoltages on the bus lines 3.

The supply source 11 for each bus line section 10 is preferably provided outside the explosion-hazard area E, but may also be arranged at least partially in the explosion-hazard area E if the design is appropriately safe. The supply source 11 is connected to each of the bus lines 3 of each bus line section 10 via decoupling inductances 30, which are used as low-pass filters for the communication signals on the bus lines 3, and are intended to suppress the transmission of signals in the direction of the supply source 11.

The supply sources 11 have a protective circuit 31, which has a fuse 32, for example a wire-link fuse, in order to limit the current flow to the corresponding bus lines 3 of the bus line section 10. Furthermore, a resistor connected in series therewith is also provided in order to limit the current flowing to the bus line 3 of the corresponding bus line section 10. A zener diode 34 is arranged between the resistor 33 and the fuse 32 between two supply lines 16 via which the supply source 11 is connected to the bus lines 3, and limits the voltage between the supply lines 16 to a voltage value which is governed by the zener diode.

The protective circuit 31, as part of the supply source 11, makes it possible to limit both the voltage and the current which is supplied to the bus line section 10 such that, for example, the supply source 11 can release only a relatively small amount of energy in the event of a fault, with this amount of energy being less than the ignition energy for any gas mixture which may be located in the explosion-hazard area.

Figure 4:
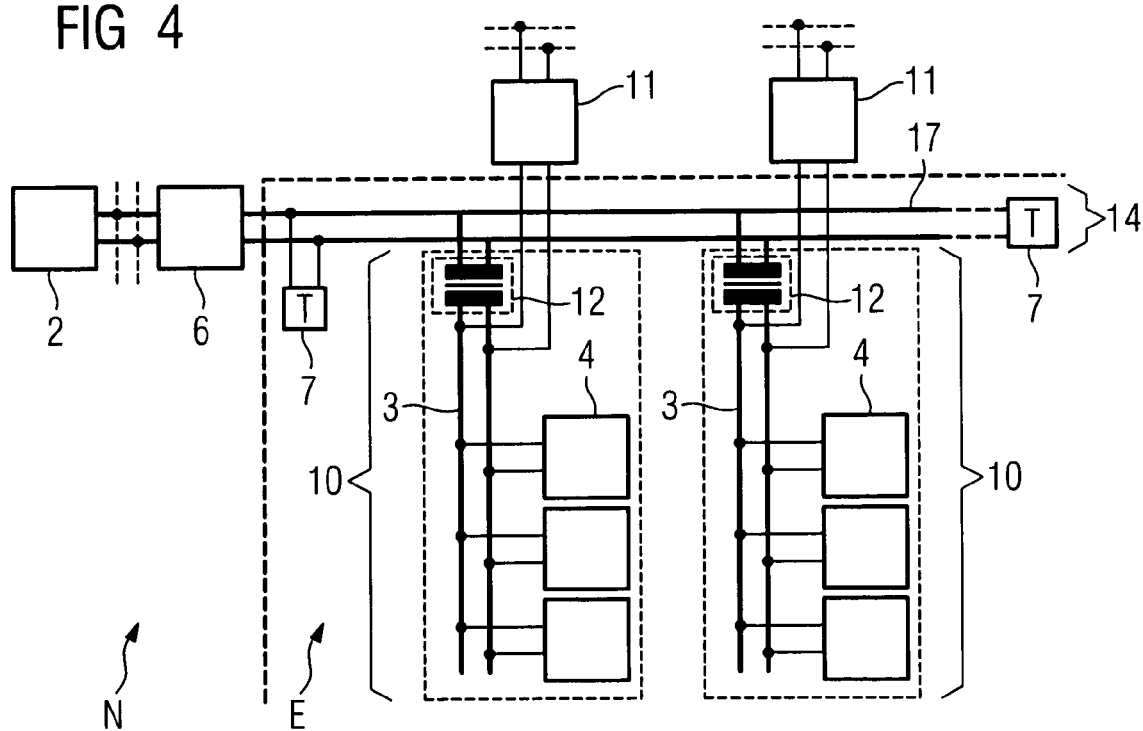
FIG. 4 shows a fieldbus system according to a second embodiment of the invention.

Whereas, in the embodiment shown in FIG. 2, the connection section 14 is coupled by means of the corresponding connection lines 17 via an isolating element 12 to one of the bus line sections in some suitable manner, in the embodiment shown in FIG. 4, the connection section 14, which is used only for signal transmission and not for transmission of the supply power between the fieldbus system and the controller 2, can be used to provide communication with a plurality of individual groups of one or more bus line sections 10, which each have a number of field devices 4. Thus, a plurality of bus line sections 10, which are connected via appropriate isolating elements 12, are connected in parallel to the connection section 14. The connection section 14 can therefore be provided in order to bridge the majority of the distance between the controller and the field devices 4 in a group of bus line sections, with the individual groups being connected by means of the connection lines 17 of the connection section via appropriate isolating elements 12.

An arrangement such as this has the advantage that no supply power is transmitted via the bus lines over a large area in the explosion-hazard area, thus making it possible to further reduce the risk. The connection lines 17 of the connection section 14 are each provided with terminating impedances 7 at both ends. Those ends of the bus line sections 10 which are opposite the isolating element 12 generally do not require a terminating impedance, providing that their length is appropriately limited, for example to a maximum of 50 m. In contrast, the length of the connection lines 17 of the connection section 14 may be up to 2000 m, as in the case of a conventional fieldbus system, since the length is not restricted by limitations relating to supply power transmission in an explosion-hazard area.

In principle, both the connection section 14 and each of the bus line sections 10 can be coupled to one or more further bus line sections 10 with the aid of one or more corresponding isolating elements 12.

Example embodiments being thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A fieldbus system, comprising:
   a plurality of bus line sections including bus lines;
   a plurality of isolating elements, at least one isolating element coupling two of the plurality of bus line sections to one another, to galvanically isolate the bus lines of the two bus line sections from one another such that a direct current is prevented from flowing between the bus lines of the two bus line sections and such that transmission of communication signals is permitted between the two bus line sections;
   at least one supply source for each of the bus line sections, the at least one supply source configured to supply an electrical power supply to field devices connected to a respective bus line section, the plurality of the bus line sections being connected via the isolating elements to form a series circuit; and
   a connection section including at least one terminal impedance, and configured to connect at least one bus line section of the plurality of bus line sections to a controller, wherein the connection section is galvanically isolated from the plurality of bus line sections and the connection section is not directly connected to a power supply source and is not directly connected to the field devices, wherein
   the at least one supply source is coupled via a decoupling inductance to bus lines of a corresponding bus line section.

2. The fieldbus system as claimed in claim 1, wherein terminating impedances are provided at the ends of the bus lines.

3. The fieldbus system as claimed in claim 1, wherein the at least one isolating element is connected to two bus lines of the two bus line sections, wherein the at least one isolating element includes a transformer with transformer coils and wherein each of the transformer coils is connected in series with a respective isolating capacitance between the two bus lines of the corresponding bus line section.

4. The fieldbus system as claimed in claim 3, wherein a suppressor diode is connected directly in parallel with at least one of the transformer coils of the transformer.

5. The fieldbus system as claimed in claim 1, wherein the supply sources for the bus line sections are designed to be current and voltage limited.

6. The fieldbus system as claimed in claim 1, wherein the plurality of bus line sections are at least partially in an explosion-hazard area, and wherein the at least one supply source for each of bus line sections is outside the explosion-hazard area.

7. The fieldbus system as claimed in claim 1, wherein the at least one bus line section is connected via the connection section to the controller for providing communication with field devices connected to the at least one bus line section.

8. The fieldbus system as claimed in claim 7, wherein a plurality of bus line sections are coupled via a respective isolating element to the connection section.

9. The fieldbus system as claimed in claim 1, wherein the fieldbus system is for use in an explosion-hazard area.

10. The fieldbus system as claimed in claim 2, wherein the at least one isolating element is connected to two bus lines of the two bus line sections, wherein the at least one isolating element includes a transformer with transformer coils and wherein each of the transformer coils is connected in series with a respective isolating capacitance between the two bus lines of the corresponding bus line section.

11. The fieldbus system as claimed in claim 10, wherein a suppressor diode is connected directly in parallel with at least one of the transformer coils of the transformer.

12. The fieldbus system as claimed in claim 2, wherein the supply sources for the bus line sections are designed to be current and voltage limited.

13. The fieldbus system as claimed in claim 2, wherein the plurality of bus line sections are at least partially in an explosion-hazard area, and wherein the at least one supply source for each of the bus line sections is outside the explosion-hazard area.

14. The fieldbus system as claimed in claim 2, wherein the at least one bus line section is connected via the connection section to the controller for providing communication with field devices connected to the at least one bus line section.

15. The fieldbus system as claimed in claim 14, wherein a plurality of bus line sections are coupled via a respective isolating element to the connection section.

* * * * *